(12) United States Patent
Nogawa

(10) Patent No.: US 8,774,144 B2
(45) Date of Patent: Jul. 8, 2014

(54) WIRELESS COMMUNICATION DEVICE

(75) Inventor: Hideki Nogawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 406 days.

(21) Appl. No.: 13/073,187

(22) Filed: Mar. 28, 2011

(65) Prior Publication Data

US 2011/0268027 A1 Nov. 3, 2011

(30) Foreign Application Priority Data

Apr. 28, 2010 (JP) .................................. 2010-103771

(51) Int. Cl.
*H04W 4/00* (2009.01)

(52) U.S. Cl.
USPC ............ 370/338; 370/252; 370/255; 709/220

(58) Field of Classification Search
None
See application file for complete search history.

(56) References Cited

U.S. PATENT DOCUMENTS

| | | | |
|---|---|---|---|
| 7,966,489 B2 * | 6/2011 | Cam-Winget et al. | 713/163 |
| 8,050,243 B2 * | 11/2011 | Ostergren | 370/338 |
| 8,131,859 B2 | 3/2012 | Fujii et al. | |
| 8,451,810 B2 | 5/2013 | Ichikawa et al. | |
| 2005/0032535 A1 | 2/2005 | Shitama et al. | |
| 2006/0106918 A1 | 5/2006 | Evert et al. | |
| 2006/0206592 A1 | 9/2006 | Fujii et al. | |
| 2006/0264227 A1 | 11/2006 | Takahashi et al. | |
| 2008/0181187 A1 * | 7/2008 | Scott et al. | 370/338 |
| 2009/0271709 A1 * | 10/2009 | Jin et al. | 715/739 |
| 2009/0274065 A1 * | 11/2009 | Jin et al. | 370/254 |
| 2009/0279526 A1 | 11/2009 | Ichikawa et al. | |
| 2010/0067406 A1 | 3/2010 | Suzuki | |
| 2010/0082978 A1 | 4/2010 | Suzuki et al. | |
| 2010/0082999 A1 | 4/2010 | Ando et al. | |

FOREIGN PATENT DOCUMENTS

| | | |
|---|---|---|
| CN | 1778073 A | 5/2006 |
| EP | 1538780 A2 | 6/2005 |
| EP | 2112844 A2 | 10/2009 |
| JP | 2005-033285 | 2/2005 |
| JP | 2005-039571 | 2/2005 |
| JP | 2005-176021 | 6/2005 |
| JP | 2006-141012 | 6/2006 |
| JP | 2008-072577 A | 3/2008 |
| JP | 2008205567 A | 9/2008 |
| JP | 2010021802 A | 1/2010 |

(Continued)

OTHER PUBLICATIONS

EP Office Action dtd Sep. 20, 2012, EP Appln. 11250400.6.

(Continued)

*Primary Examiner* — Donald Mills
(74) *Attorney, Agent, or Firm* — Banner & Witcoff, Ltd.

(57) ABSTRACT

A wireless communication device may obtain, from each of one or more access points, access point information including network identification information corresponding to the access point. The wireless communication device may determine, in a case where specific network identification information corresponding to a specific access point is selected by a user from among one or more network identification information, whether specific access point information obtained from the specific access point includes support information indicating that the specific access point is supporting an automatic wireless setting mode. The wireless communication device may perform a wireless setting in accordance with the automatic wireless setting mode in a first case where a determination is made that the specific access point information includes the support information.

8 Claims, 5 Drawing Sheets

(56) References Cited

FOREIGN PATENT DOCUMENTS

| | | |
|---|---|---|
| JP | 2010-074334 | 4/2010 |
| JP | 2010-087908 | 4/2010 |
| JP | 2010-087909 | 4/2010 |
| WO | 01/63843 A1 | 8/2001 |
| WO | 2008148213 A1 | 12/2008 |

OTHER PUBLICATIONS

Extended EP Search Report mailed Jul. 12, 2011, EP application 11250400.6-2412.

Wi-Fi Alliance: "Wi-Fi Certified for Wi-Fi Protected Setup: Easing the User Experience for Home and Small Office Wi-Fi Networks," 2007, pp. 1-14, WP002567243 [retrieved Feb. 1, 2010 from URL http://www.wi-fi.org/wp/wifi-protected-setup].

Japanese Office Action mailed on Aug. 6, 2013, JP Application No. 2010-103771.

Chinese Office Action issued Jul. 3, 2013, Chinese Application No. 201110084202.5.

Chinese Second Office Action mailed Jan. 30, 2014, Chinese Application No. 201110084202.5, English translation.

JP Notification of Reason for Rejection mailed May 13, 2014, JP Appln. 2013-209072, English translation.

* cited by examiner

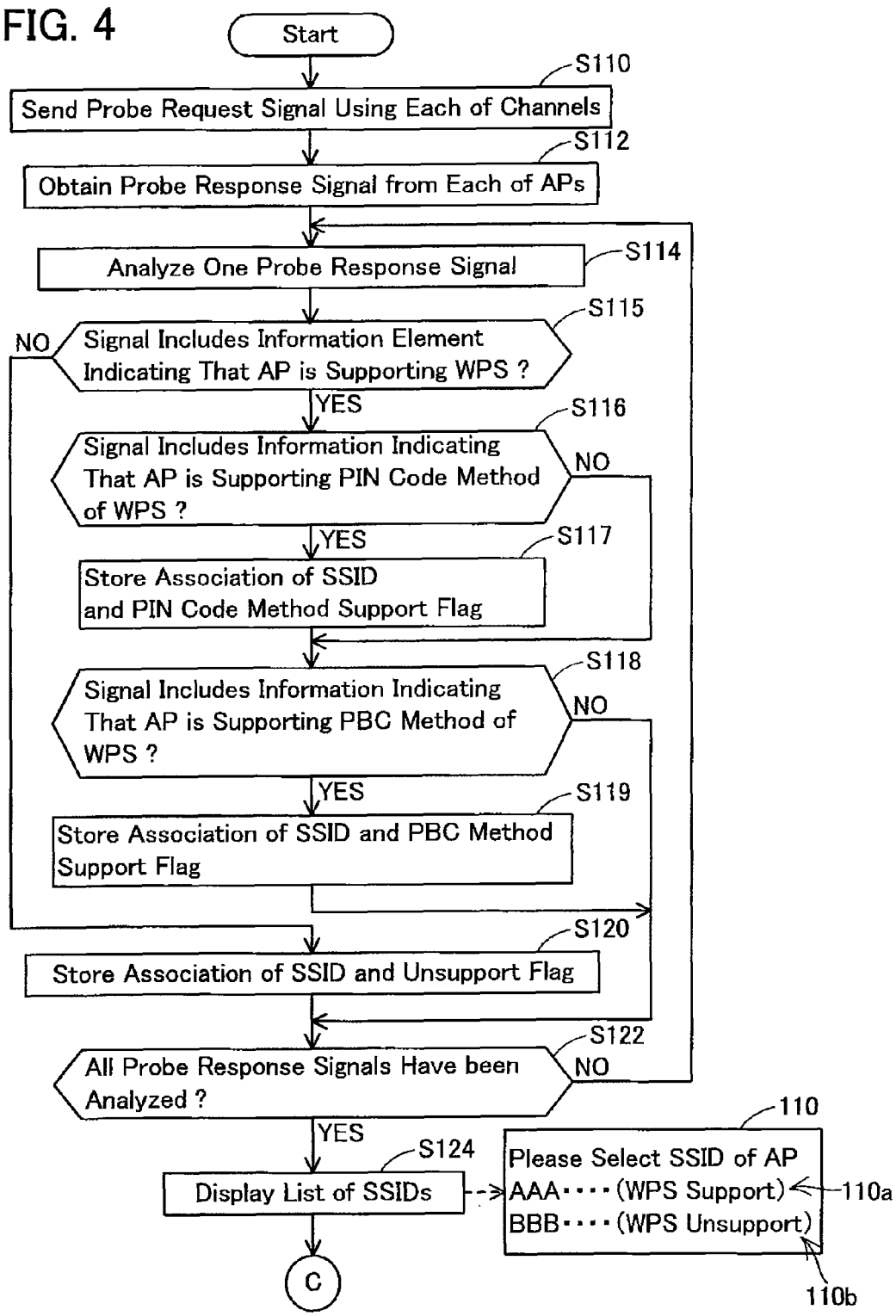

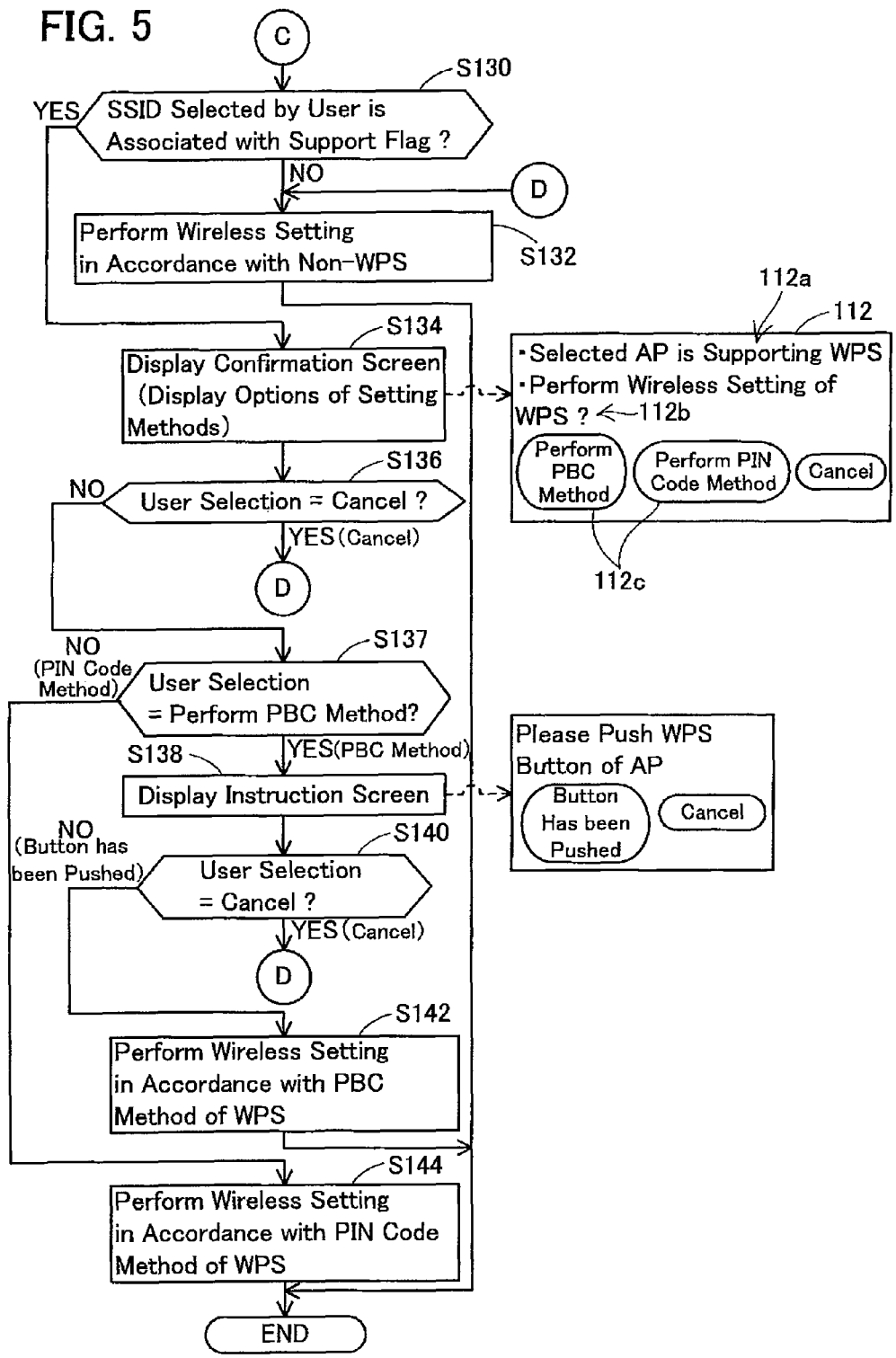

WIRELESS COMMUNICATION DEVICE

CROSS-REFERENCE TO RELATED APPLICATIONS

This application claims priority to Japanese Patent Application No. 2010-103771, filed on Apr. 28, 2010, the contents of which are hereby incorporated by reference into the present application.

TECHNICAL FIELD

The present description discloses a technology for wirelessly connecting a wireless communication device to an access point.

DESCRIPTION OF RELATED ART

Known procedures for wirelessly connecting a wireless communication device to an access point include an automatic wireless setting mode and a non-automatic wireless setting mode. Examples of the automatic wireless setting mode include, e.g., WPS (Wi-Fi Protected Setup), AOSS (Airstation One-touch Secure System; registered trademark) and SES (Secure Easy Setup; registered trademark). In the automatic wireless setting mode, ordinarily, the wireless communication device obtains, from the access point, a wireless profile (authentication method, encryption method and the like) currently set in the access point, and the wireless communication device is wirelessly connected to the access point using the wireless profile. In the non-automatic wireless setting mode, ordinarily, a user checks beforehand the wireless profile currently set in the access point, and instructs the wireless communication device to be wirelessly connected to the access point using the wireless profile. In the case of the automatic wireless setting mode, the user does not have to check beforehand the wireless profile currently set in the access point, and hence the wireless communication device can become wirelessly connected to the access point more easily than in the non-automatic wireless setting mode.

SUMMARY

When using the automatic wireless setting mode, however, the user must check beforehand whether the access point to which the wireless communication device is to be wirelessly connected (hereafter referred to as "specific access point") is supporting the automatic wireless setting mode, and must thereupon instruct the wireless communication device to perform the automatic wireless setting mode. Performing such checks and issuing the abovementioned instruction is difficult for a user having limited knowledge of wireless communication. Such being the case, it is possible for the user to instruct the wireless communication device to perform the non-automatic wireless setting mode, however, as described above, wirelessly connecting the wireless communication device to the specific access point is more difficult using the non-automatic wireless setting mode. That is, wirelessly connecting the wireless communication device to the access point is difficult for the user having limited knowledge of wireless communication.

The present description provides a technology that allows a user to cause a wireless communication device to be wirelessly connected to an access point in an easy manner.

One technique disclosed in the present application is a wireless communication device. The wireless communication device may comprise an obtaining unit, a determination unit, and a wireless setting performing unit. The obtaining unit may be configured to obtain, from each of one or more access points, access point information including network identification information corresponding to the access point. The determination unit may be configured to determine, in a case where specific network identification information corresponding to a specific access point with which the wireless communication device is to be wirelessly connected is selected by a user from among one or more network identification information obtained from the one or more access points, whether specific access point information obtained from the specific access point includes support information indicating that the specific access point is supporting an automatic wireless setting mode. The wireless setting performing unit may be configured to perform a wireless setting in accordance with the automatic wireless setting mode in a first case where a determination is made that the specific access point information includes the support information.

A control method and computer program for realizing the function of the abovementioned wireless communication device, as well as a computer-readable recording device that stores the computer program, are likewise novel and useful.

BRIEF DESCRIPTION OF DRAWINGS

FIG. 4 is a flowchart of a process performed by a multi-function device in a second embodiment.

FIG. 5 illustrates a flowchart continued from FIG. 4.

EMBODIMENT

First Embodiment (System Configuration)

Figure 1:
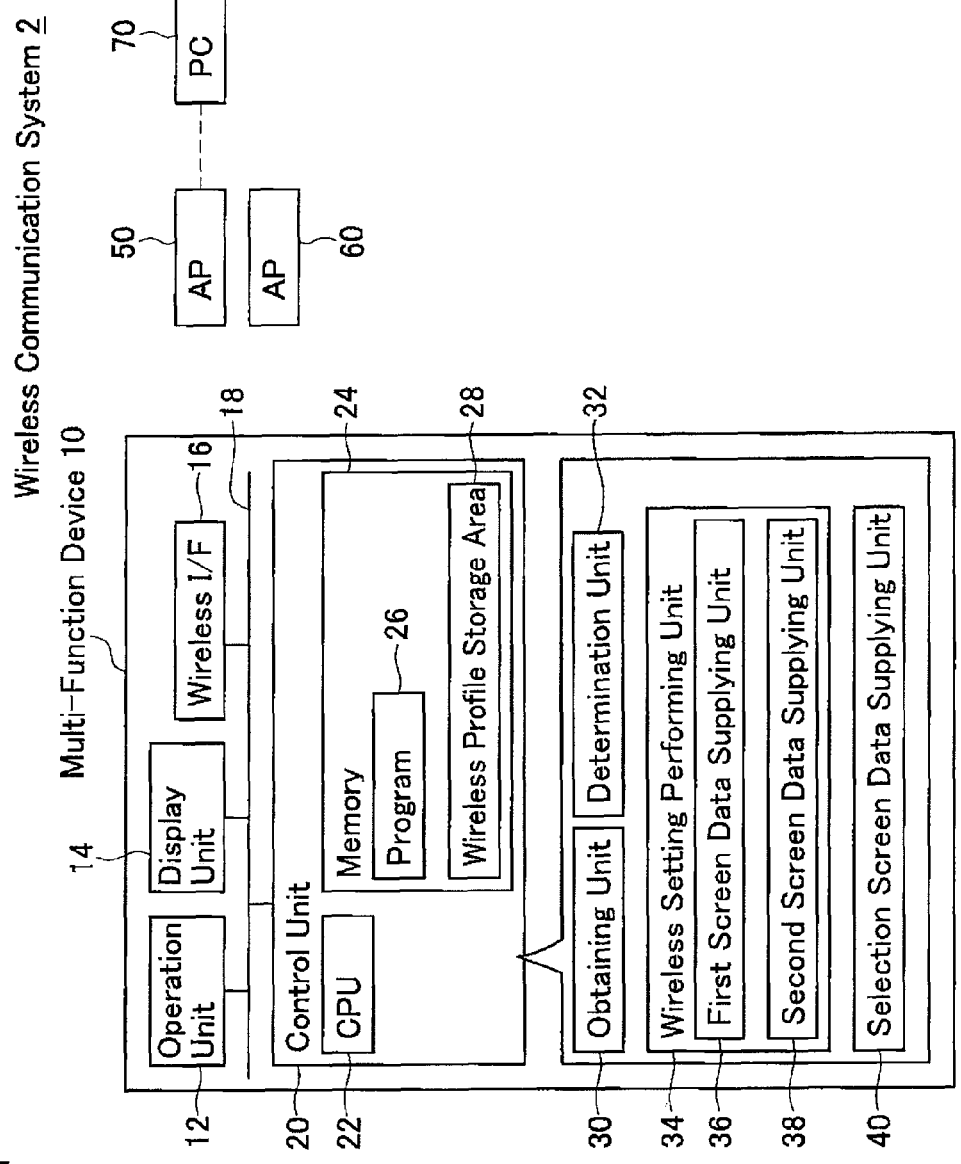
FIG. 1 illustrates a configuration of a wireless communication system in an embodiment.

An embodiment will be explained with reference to accompanying drawings. As illustrated in FIG. 1, a wireless communication system 2 comprises a multi-function device 10, a plurality of access points 50, 60 (hereafter, "access point" will be referred to as "AP"), and a PC 70. The multi-function device 10 is a peripheral device of the PC 70. The APs 50, 60 relay wireless communication between a pair of devices (e.g., the multi-function device 10 and the PC 70). The PC 70 is wirelessly connected to the AP 50. The multi-function device 10 is wirelessly connected to any of the plurality of APs 50, 60, through performing of a below-described wireless setting (i.e. wireless security setting). As used in the present embodiment, the term "wireless connection" refers to the following situation. Specifically, in a state where a device is wirelessly connected to an AP (e.g., the AP 50), the device can communicate with another device via the AR Conversely, in a state where the device is not wirelessly connected to the AP, the device can perform wireless communication with the AP (e.g., wireless communication in a form of a Probe Request signal and Probe Response signal described below), but cannot communicate with other devices via the AP.

(Configuration of the Multi-Function Device 10)

The multi-function device 10 can perform multiple functions including a printing function and a scanning function. The multi-function device 10 comprises an operation unit 12, a display unit 14, a wireless interface 16 and a control unit 20. The respective units 12, 14, 16 and 20 are connected to a bus line 18. The multi-function device 10 further comprises a printing performing unit and a scanning performing unit, not shown. The operation unit 12 comprises a plurality of keys. A user can input a variety of information into the multi-function device 10 by operating the operation unit 12. The display unit 14 is a display for displaying a variety of information. The wireless interface 16 is an interface for enabling the multi-function device 10 to perform the wireless communication.

The control unit 20 comprises a CPU 22 and a memory 24. The memory 24 comprises, e.g., a ROM, a RAM and the like. The memory 24 stores a program 26. The CPU 22 performs various processes according to the program 26 stored in the memory 24. Respective functions of an obtaining unit 30, a determination unit 32, a wireless setting performing unit 34 and a selection screen data supplying unit 40 are realized through performing, by the CPU 22, of processes according to the program 26. The wireless setting performing unit 34 comprises first and second screen data supplying units 36, 38.

The memory 24 comprises a wireless profile storage area 28. The wireless profile storage area 28 is an area for storing a wireless profile (e.g., an authentication method, an encryption method, a wireless password (WEP key (Wired Equivalent Privacy Key), a pass phrase or the like)) in order for the multi-function device 10 to be wirelessly connected to an AP (e.g., the AP 50). No wireless profile is stored in the wireless profile storage area 28 at a shipment stage of the multi-function device 10. The wireless profile is stored into the wireless profile storage area 28 through performing, by the control unit 20, of the below-described wireless setting.

(Modes for Wireless Setting)

The control unit 20 performs wireless setting in accordance with an automatic wireless setting mode or a non-automatic wireless setting mode. The multi-function device 10 is supporting a WPS automatic wireless setting mode devised by the Wi-Fi Alliance. In particular, the multi-function device 10 is supporting a PBC (Push Button Configuration) method and a PIN (Personal Identification Number) code method of WPS.

(PBC Method)

The PBC method is a method which a wireless communication of WPS is initiated when (1) a predefined operation is applied to the operation unit 12 of the multi-function device 10, and (2) a predefined button provided in an AP to which the multi-function device 10 is to be wirelessly connected is operated (hereafter referred to as "specific AP"). Note that the wireless communication of WPS means a communication for transmitting a wireless profile currently set in the specific AP, from the specific AP to the multi-function device 10. More specifically, if the user wishes to use the PBC method of WPS, it is checked beforehand whether or not the specific AP is supporting the PBC method of WPS. For instance, the user performs the above-described check by checking a manual for the specific AP. If it is confirmed that the specific AP is supporting the PBC method of WPS, the user operates the operation unit 12, in a state where a menu screen for wireless setting is displayed on the display unit 14 of the multi-function device 10, to select thereby the automatic wireless setting mode between the automatic wireless setting mode and the non-automatic wireless setting mode. Further, the user operates the operation unit 12, to select thereby the PBC method between the PBC method and the PIN code method. Next, the user operates the abovementioned predefined button that is provided in the specific AP. As a result, the wireless communication of WPS is initiated between the multi-function device 10 and the specific AP.

The wireless setting performing unit 34 (FIG. 1) of the multi-function device 10 performs the wireless setting by performing the wireless communication of WPS. More specifically, the wireless setting performing unit 34 obtains, through the wireless communication of WPS, a wireless profile currently set in the specific AP (i.e. a wireless profile that the specific AP is currently operating) from the specific AP, and stores the wireless profile in the wireless profile storage area 28.

(PIN Code Method)

The PIN code method is a method in which the wireless communication of WPS is initiated when (1) a predefined operation is applied to the operation unit 12 of the multi-function device 10 and (2) a PIN code created by the multi-function device 10 is inputted to the specific AP by the user. More specifically, if the user wishes to use the PIN code method of WPS, it is checked beforehand whether or not the specific AP support the PIN code method of WPS. Next, the user selects the automatic wireless setting mode in the menu screen for wireless setting, and selects then the PIN code method between the PBC method and the PIN code method. In this case, the wireless setting performing unit 34 creates the PIN code in accordance with a procedure established beforehand, and displays the PIN code on the display unit 14. The user inputs the PIN code displayed on the display unit 14 into the specific AP. For instance, the user access a WEB server provided in the specific AP, using the PC 70, and inputs the PIN code on a WEB screen supplied by the WEB server. The wireless communication of WPS is performed between the multi-function device 10 and the specific AP if the PIN code is inputted correctly into the specific AP (that is, if the PIN code displayed on the display unit 14 is identical to the PIN code inputted into the specific AP). The process thereafter is identical to that of the PBC method.

(Non-Automatic Wireless Setting Mode)

The non-automatic wireless setting mode, which is explained in more detail further on, is a mode for performing wireless setting without using WPS. In order to use the automatic wireless setting mode of WPS, the user must check whether or not the specific AP is supporting the WPS, and must select the automatic wireless setting mode in the menu screen for wireless setting, as described above. However, performing the above-described check and selecting the automatic wireless setting mode are difficult for the user having little knowledge of wireless communication. There is a chance that such the user may select the non-automatic wireless setting mode, and not the automatic wireless setting mode, in the menu screen for wireless setting, even if the specific AP supports WPS. The process in the flowcharts of FIG. 2 and FIG. 3 is initiated upon selection of the non-automatic wireless setting mode in the menu screen.

(Process Performed by the Multi-Function Device 10)

Figure 2:
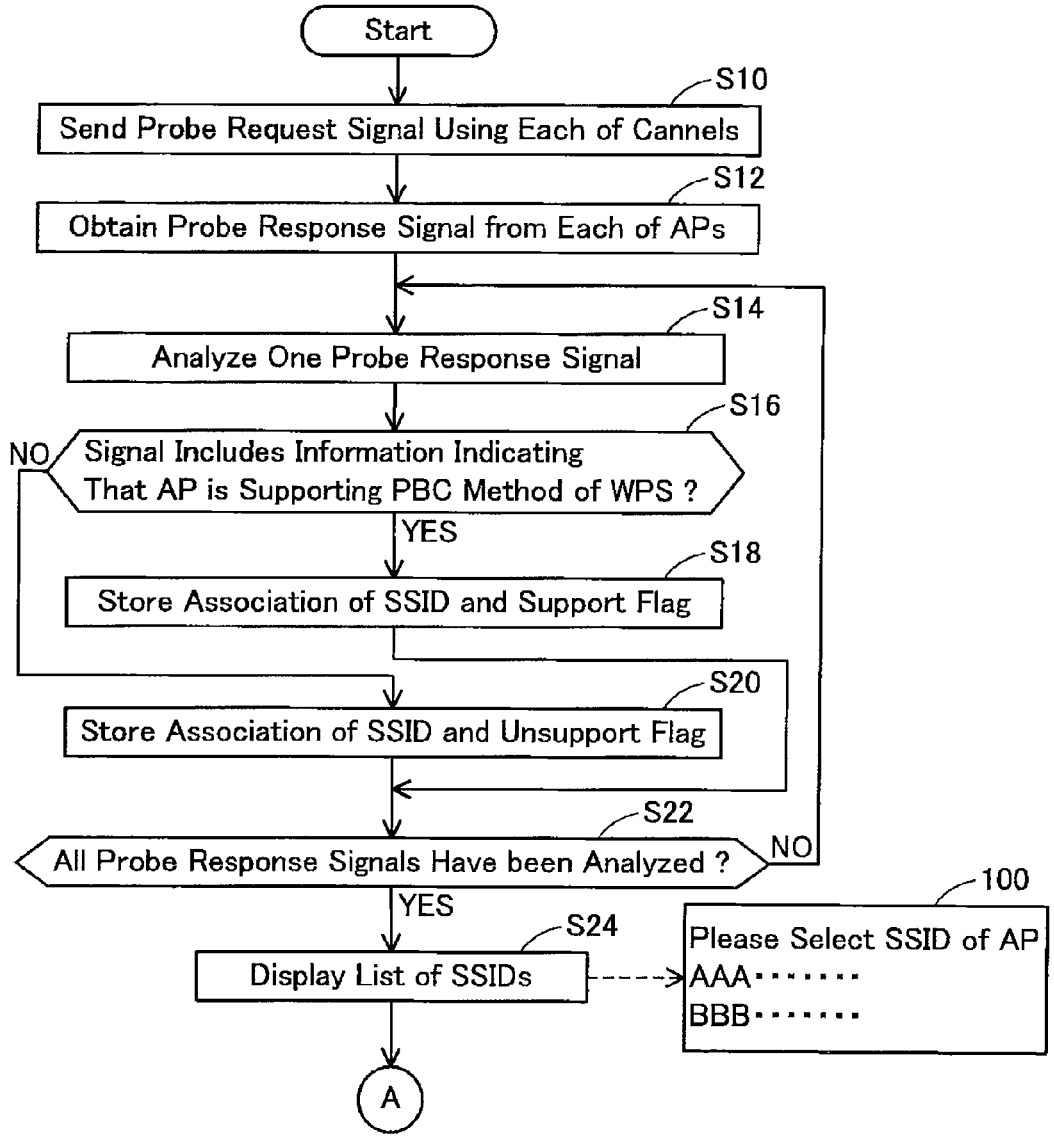
FIG. 2 is a flowchart of a process performed by a multi-function device in a first embodiment.
Figure 3:
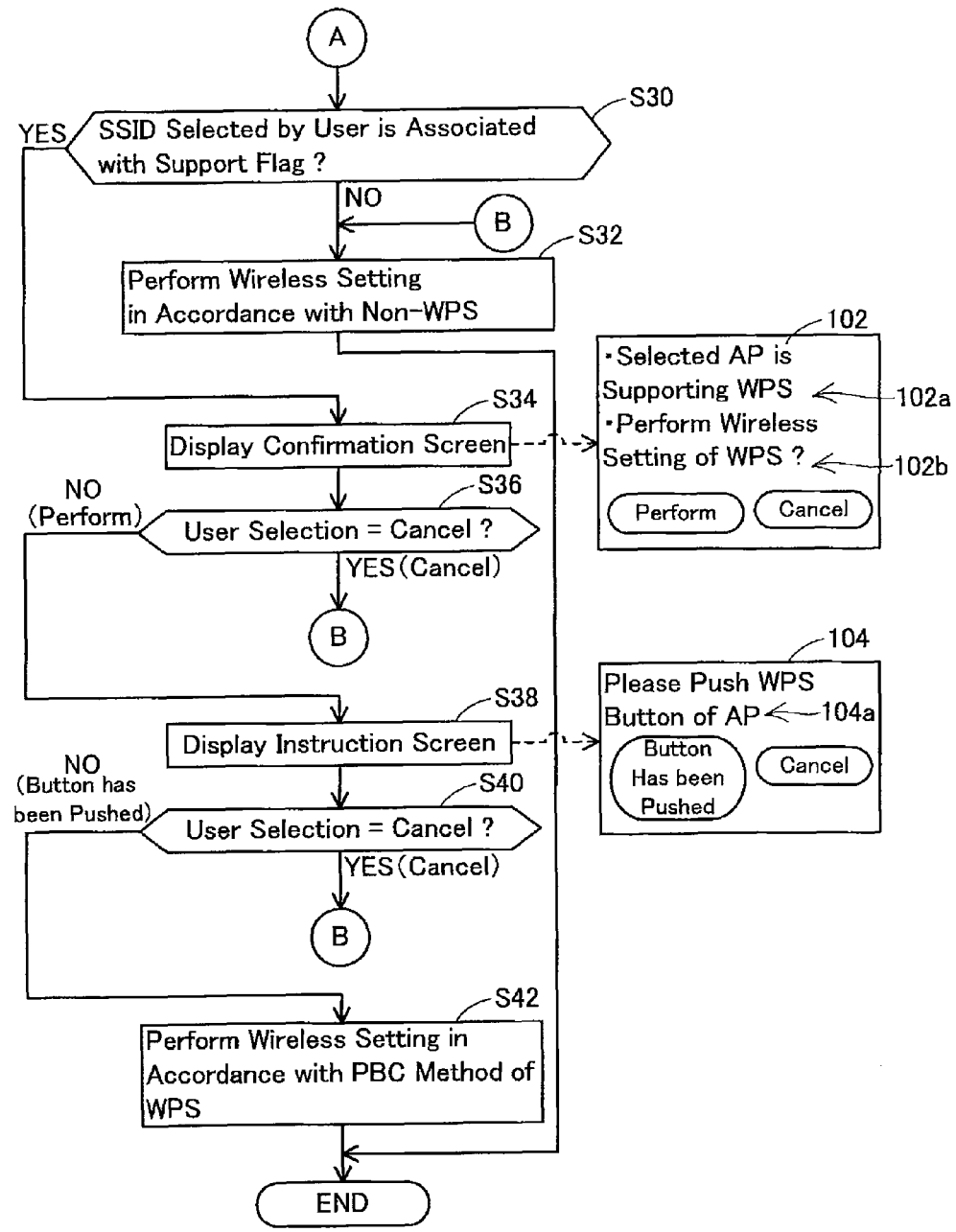
FIG. 3 illustrates a flowchart continued from FIG. 2.

The process of FIG. 2 and FIG. 3 is explained next. The below explanation of the process of FIG. 2 and FIG. 3 is based on an example in which the AP 50 is supporting both the PBC method and the PIN code method of WPS, and the AP 60 does not support the WPS. Firstly, in S10, the obtaining unit 30 (FIG. 1) controls the wireless interface 16, to sequentially select thereby one channel from among a plurality of channels (i.e. frequency bands) for wireless communication, and sequentially transmits a Probe Request signal using the sequentially selected channels. Upon reception of the Probe Request signal, the APs 50, 60 transmit a Probe Response signal, as a response to the Probe Request signal, to the multi-function device 10. As a result, the obtaining unit 30 obtains, in S12, one or more Probe Response signals from one or more APs (in the present embodiment, two APs 50, 60). The one or more Probe Response signals obtained in S12 each includes SSID (Service Set Identifier) corresponding to the AP that is a transmission source of the Probe Response signal.

Next, in S14, the determination unit 32 (FIG. 1) analyzes one Probe Response signal (hereafter, "target Probe Response signal") from among the one or more Probe Response signals obtained in S12. More specifically, in S14 the determination unit 32 reads various types of information included in the target Probe Response signal. Next, in S16, the determination unit 32 determines whether information (hereafter, "first type of information") indicating that the PBC method of WPS is being supported is included in the target Probe Response signal. Specifically, in S16 the determination unit 32 determines whether the. AP that is the transmission source of the target Probe Response signal is supporting the PBC method of WPS.

As described above, the AP 50 is supporting the PBC method and the PIN code method of WPS. Therefore, if the target Probe Response signal is a signal obtained from the AP 50, the target Probe Response signal includes an Information Element indicating that the WPS is being supported. This Information Element includes the first type of information indicating that the PBC method of WPS is being supported, and a second type of information indicating that the PIN code method of WPS is being supported. Therefore, YES is determined in S16 if the target Probe Response signal is a signal obtained from the AP 50. In this case, the control unit 20 associates and stores, in S18, a support flag and the SSID (i.e. the SSID of the AP 50) included in the target Probe Response signal, in the memory 24.

On the other hand, the AP 60 does not support the WPS. Therefore, the target Probe Response signal does not include the Information Element indicating that WPS is being supported if the target Probe Response signal is a signal obtained from the AP 60. In this case, the target Probe Response signal does not include the first type of information, either. Therefore, NO is determined in S16 if the target Probe Response signal is a signal obtained from the AP 60. In this case, the control unit 20 associates and stores, in S20, an unsupport flag and the SSID (i.e. the SSID of the AP 60) included in the target Probe Response signal, in the memory 24.

Once S18 or S20 is over, the process proceeds to S22. In S22, the determination unit 32 determines whether the process from S14 to S20 has been performed for all of the Probe Response signals obtained in S12. If the result is NO, the determination unit 32 returns to S14, and analyzes one Probe Response signal for which the process from S14 to S20 has not been performed yet.

If all of the Probe Response signals have been processed (YES in S22), in S24, the selection screen data supplying unit 40 (FIG. 1) creates selection screen data indicating a selection screen 100 using the one or more Probe Response signals obtained in S12. More specifically, in S24, the selection screen data supplying unit 40 creates the selection screen data indicating the selection screen 100 that includes a list of the SSIDs included in each Probe Response signal obtained in S12. In S24, the selection screen data supplying unit 40 supplies the created selection screen data to the display unit 14. In the present embodiment, the selection screen 100 includes the SSID (AAA . . . ) of the AP 50 and the SSID (BBB . . . ) of the AP 60. By operating the operation unit 12, the user can select one SSID corresponding to one AP to which the multi-function device 10 is to be wirelessly connected, from among the two SSIDs. Once the user selects one SSID, the process proceeds to S30 of FIG. 3. Hereafter, the one SSID selected by the user in S24 of FIG. 2 will be referred to as "selected SSID", and the AP corresponding to the selected SSID will be referred to as "selected AP".

If the AP is supporting the PBC method of WPS, as described above, an association of the SSID of the AP and the support flag is stored in the memory 24 (S18 of FIG. 2). If the AP is not supporting the PBC method of WPS, an association of the SSID of the AP and the unsupport flag is stored in the memory 24 (S20 of FIG. 2). In S30 of FIG. 3, the determination unit 32 determines whether the support flag is associated with the selected SSID by referring to the stored content in the memory 24. If the result is YES, the process proceeds to S34, and if the result is NO, to S32.

In S32 (in the case where the unsupport flag is associated with the selected SSID), the wireless setting performing unit 34 performs the wireless setting according to a non-WPS (i.e. according to a procedure other than the WPS). More specifically, the wireless setting performing unit 34 (FIG. 1) displays, on the display unit 14, a screen for encouraging the user to select one type of authentication method from among a plurality of types of authentication methods that the multi-function device 10 is supporting. The user selects one type of authentication method by operating the operation unit 12. Next, the wireless setting performing unit 34 displays, on the display unit 14, a screen for encouraging the user to select one type of encryption method from among a plurality of encryption methods that the multi-function device 10 is supporting. The user selects one type of encryption method by operating the operation unit 12. The wireless setting performing unit 34 further displays, on the display unit 14, a screen for encouraging the user to input a wireless password, if a combination of the encryption method and the authentication method which require the wireless password (WEP key, pass phrase or the like) is selected. The user inputs the wireless password by operating the operation unit 12. The wireless setting performing unit 34 stores, in the wireless profile storage area 28, the wireless profile (the authentication method, encryption method, and wireless password) selected by the user. The wireless setting according to the non-WPS in S32 is thereby completed.

In order to cause the multi-function device 10 to be wirelessly connected to the selected AP appropriately, the user must select, in S32, the authentication method and the encryption method currently set in the selected AP (i.e. the authentication method and the encryption method currently run in the selected AP). In S32, the user must input the wireless password currently set in the selected AR The process of the flowcharts in FIG. 2 and FIG. 3 ends once S32 is over.

In S34 (in the case where the support flag is associated with the selected SSID), the first screen data supplying unit 36 (FIG. 1) supplies, to the display unit 14, screen data that includes a message 102a indicating that the selected AP is supporting the WPS, and a message 102b for encouraging the user to select whether wireless setting according to the WPS is to be performed. As a result, a confirmation screen 102 is displayed on the display unit 14. By operating the operation unit 12, the user can select whether the wireless setting according to the WPS is to be performed or not in the multi-function device 10.

Next, in S36, the control unit 20 determines which button the user has selected from between a button indicating "cancel" and a button indicating "perform" in the confirmation screen 102. In S36, the control unit 20 determines YES if the user has selected the button indicating "cancel", and the process proceeds to the above-described S32. In this case, the wireless setting performing unit 34 performs the wireless setting according to the non-WPS.

If the user has selected the button indicating "perform", the control unit 20 determines NO in S36, and the process proceeds to S38. In S38, the control unit 20 supplies, to the display unit 14, screen data that includes a message 104a encouraging the user to operate a WPS button of the selected AP. As a result, an instruction screen 104 is displayed on the display unit 14. The user operates the WPS button of the selected AP according to the message 104a in the instruction screen 104. After having operated the WPS button of the selected AP, the user selects a button indicating "button has been pushed" in the instruction screen 104.

Next, in S40, the control unit 20 determines which button the user has selected from between the button indicating "cancel" and the button indicating "button has been pushed" in the instruction screen 104. In S40, the control unit 20 determines YES if the user has selected the button indicating "cancel", and the process proceeds to the above-described S32. In this case, the wireless setting performing unit 34 performs the wireless setting according to the non-WPS.

If the user has selected the button indicating "button has been pushed", the control unit 20 determines NO in S40, and the process proceeds to S42. In S42, the wireless setting performing unit 34 performs the wireless setting according to the PBC method of WPS. The wireless setting with the PBC method of WPS has already been described above, and a recurrent explanation thereof will be omitted. The process of the flowcharts in FIG. 2 and FIG. 3 ends once S42 is over.

As described above, the wireless setting according to the non-WPS as performed in S32 can be regarded as a process of deciding the wireless profile (the authentication method, encryption method and wireless password) that the multi-function device 10 is to use in order to be wirelessly connected to the selected AP, in accordance with the instruction by the user (the selection operation, input operation and so forth performed by the user), and of storing the wireless profile in the wireless profile storage area 28. By contrast, the wireless setting according to the WPS as performed in S42 can be regarded as a process of obtaining, from the selected AP, the wireless profile that the multi-function device 10 is to use in order to be wirelessly connected to the selected AP, and of storing the wireless profile in the wireless profile storage area 28.

The wireless profile to be used by the multi-function device 10 becomes stored in the wireless profile storage area 28 once the flowchart of FIG. 2 and FIG. 3 is over. Although not shown in FIG. 1, the control unit 20 comprises a communication performing unit that performs a communication for causing the multi-function device 10 to be wirelessly connected to the selected AP (i.e. a communication in order for the selected AP to authenticate the multi-function device 10), using the wireless profile stored in the wireless profile storage area 28 in S32 or S42 of FIG. 3. The multi-function device 10 is wirelessly connected to the selected AP if an appropriate wireless profile is stored in S32 or S42 of FIG. 3. For instance, the multi-function device 10 can communicate with the PC 70 via the AP 50 in a state where the multi-function device 10 and the AP 50 are wirelessly connected. For instance, the control unit 20 can receive print data from the PC 70 via the AP 50. In this case, the control unit 20 performs printing according to the print data. For instance, the control unit 20 can transmit scanned data created by a scanning performing unit (not shown) to the PC 70, via the AP 50.

The wireless communication system 2 of the first embodiment has been explained in detail above. When the user selects one SSID (i.e. the selected SSID) in the selection screen 100 of FIG. 2, the multi-function device 10 determines whether the selected AP is supporting the PBC method of WPS (S30 in FIG. 3). If the determination result is affirmative (YES in S30 of FIG. 3), the multi-function device 10 performs the wireless setting in accordance with the PBC method of WPS (S42 of FIG. 3). In the present embodiment, thus, the multi-function device 10 performs the wireless setting in accordance with the automatic wireless setting mode (PBC method of WPS) upon selection of the AP 50 that is supporting the PBC method of WPS, even if the non-automatic wireless setting mode is selected in the menu screen for wireless setting (i.e. even if the instruction for performing the non-automatic wireless setting mode is issued).

In a case where the user wishes to cause the multi-function device 10 to be wirelessly connected to the AP 50, the user having limited knowledge of the wireless communication may select the non-automatic wireless setting mode in the menu screen for wireless setting, even if the AP 50 is supporting the WPS, as described above. In such cases as well, the multi-function device 10 can be wirelessly connected to the AP 50 using the PBC method of WPS when the user selects the AP 50 in the selection screen 100 of FIG. 2. Therefore, the multi-function device 10 can be wirelessly connected to the AP 50, using the PBC method of WPS, even if the user does not select the automatic wireless setting mode in the menu screen for wireless setting (i.e. even if the instruction for performing the automatic wireless setting mode is not issued) upon checking whether or not the AP 50 is supporting the WPS. As a result, the user can easily have the multi-function device 10 to be wirelessly connected to the AP 50.

In the present embodiment, the multi-function device 10 performs the wireless setting with the PBC method of WPS in a case that the Probe Response signal obtained from the selected AP includes the information indicating that the PBC method is being supported (YES in S30 of FIG. 3), i.e. in the case that the selected AP is supporting the PBC method of WPS. Therefore, the multi-function device 10 can perform the wireless setting appropriately with the PBC method of WPS that the selected AP is supporting.

The multi-function device 10 is an example of a "wireless communication device". The Probe Response signal and the SSID are examples of "access point information" and "network identification information", respectively. The first type of information (information indicating that the PBC method of WPS is being supported) included in the Information Element indicating that WPS is stored is an example of "support information" and "method information". The messages 102a, 102b in the confirmation screen 102 of FIG. 3 are examples of a "first message", and the screen data supplied to the display unit 14 in S34 of FIG. 3 is an example of "first screen data". The case of YES in S30 of FIG. 3, and NO in S36 of FIG. 3 are examples of a "first case" and a "second case", respectively.

Second Embodiment

A second embodiment will be explained focusing on differences from the first embodiment. In the present embodiment, the process of the flowcharts in FIG. 4 and FIG. 5 are performed, instead of the process in the flowcharts of FIG. 2 and FIG. 3, in a case where a non-automatic wireless setting mode is selected in the menu screen for wireless setting. In the present embodiment as well, the process FIG. 4 and FIG. 5 will be explained based on an example on an instance where the AP 50 is supporting both the PBC method and the PIN code method of WPS, and the AP 60 does not support the WPS.

Steps S110 to S114 in FIG. 4 are identical to steps S10 to S14 in FIG. 2. In S115, the determination unit 32 determines whether the target Probe Response signal includes the Information Element indicating that the WPS is being supported. Specifically, the determination unit 32 determines in S115 whether the AP that is the transmission source of the target Probe Response signal is supporting WPS. If the target Probe Response signal is a signal obtained from the AP 50, the target Probe Response signal includes the Information Element (hereafter, "specific IE") indicating that the WPS is being supported. Therefore, if the target Probe Response signal is a signal obtained from the AP 50, YES is determined in S115, and the process proceeds to S116.

In S116 the determination unit 32 determines whether the specific IE in the target Probe Response signal includes the second type of information indicating that the PIN code method of WPS is being supported. If the target Probe Response signal is a signal obtained from the AP 50, then the second type of information is included in the specific IE, and hence YES is determined in S116. In this case, the control unit 20 associates and stores, in S117, a PIN code method support flag and an SSID (i.e. the SSID of the AP 50) included in the target Probe Response signal, in the memory 24. Known APs that support WPS ordinarily support the PIN code method. Therefore, YES is ordinarily determined in S116.

Once S117 is over, or in case of NO in S116, the determination unit 32 determines, in S118, whether the specific IE in the target Probe Response signal includes the first type of information indicating that the PBC method of WPS is being supported. If the target Probe Response signal is a signal obtained from the AP 50, then the first type of information is included in the specific IE, and hence YES is determined in S118. In this case, the control unit 20 associates and stores, in S119, a PBC method support flag and an SSID (i.e. the SSID of the AP 50) included in the target Probe Response signal, in the memory 24.

In case of NO in S115, the control unit 20 associates and stores, in S120, an unsupport flag and an SSID (i.e. an SSID of the AP 60) included in the target Probe Response signal, in the memory 24, as is identical to S20 in FIG. 2. Step S122 is identical to S22 in FIG. 2. Once S122 is over, the process proceeds to S124.

Step S124 is substantially identical to S24 in FIG. 2, but differs from the latter in that selection screen data is created in such a manner that the SSID of the AP 50 and the SSID of the AP 60 are displayed so as to be distinguishable by the user. Upon creation of selection screen data, specifically, the selection screen data supplying unit 40 adds a character string 110a, namely "WPS support" to the SSID (i.e. the SSID of AP 50) with which at least one of the PIN code method support flag and the PBC method support flag is associated, and adds a character string 110b, namely "WPS UnSupport" to the SSID (i.e. the SSID of the AP 60) with which an unsupport flag is associated. A selection screen 110 of FIG. 4 is displayed as a result. The user can learn thus whether the APs 50, 60 that correspond to the respective SSIDs support WPS, and can select thereupon one SSID. Once the user selects one SSID, the process proceeds to S130 of FIG. 5.

In S130 of FIG. 5, the determination unit 32 determines whether at least one of the PIN code method support flag and the PBC method support flag is associated with the selected SSID by referring to the stored content in the memory 24. If the result is YES, the process proceeds to S134, and if the result is NO, to S132.

The wireless setting according to the non-WPS performed in S132 is identical to that of S32 in FIG. 3. In S134, the first screen data supplying unit 36 and the second screen data supplying unit 38 (FIG. 1) cooperatively supply the screen data to the display unit 14. As a result, a confirmation screen 112 is displayed on the display unit 14. The screen data supplied in S132 includes messages 112a, 112b identical to the messages 102a, 102b of FIG. 3. In a case that the PIN code method support flag and the PBC method support flag are both associated with the selected SSID, then the second screen data supplying unit 38 creates, in S132, screen data including a message 112c in order for the user to select one setting method between the PIN code method and the PBC method. By operating the operation unit 12, the user can select one setting method from among the PIN code method and the PBC method. Screen data indicating a screen identical to the confirmation screen 102 of FIG. 3 is created in S132 in a case that only one from among the PIN code method support flag and the PBC method support flag is associated with the selected SSID.

Next, the control unit 20 determines (S136) whether the user has selected any from among the button indicating "cancel", the button indicating "perform PBC method" and the button indicating "perform PIN code method" in the confirmation screen 112. In S136, the control unit 20 determines YES if the user has selected the button indicating "cancel", and the process proceeds to S132. In this case, the wireless setting performing unit 34 performs the wireless setting according to the non-WPS.

If the user has selected the button indicating "perform PBC method", the control unit 20 determines NO in S136, determines next YES in S137, and the process proceeds to S138. Steps S138 to S142 are identical to steps S38 to S42 in FIG. 3.

If the user has selected the button indicating "perform PIN code method", the control unit 20 determines NO in S136, determines next NO in S137, and the process proceeds to S144. In S144, the wireless setting performing unit 34 performs the wireless setting with the PIN code method of WPS. The wireless setting with the PIN method of WPS has already been described in the first embodiment, and a recurrent explanation thereof will be omitted.

The present embodiment allows the user to select the desired setting method in a case where the selected AP is supporting both the PIN code method and the PBC method. The multi-function device 10 can thus perform wireless setting of WPS with the setting method desired by the user.

In the present embodiment, the Information Element (i.e. the specific IE) indicating that WPS is being supported is an example of "support information". The first type of information and the second type of information are examples of "method information". The two buttons 112c in the confirmation screen 112 of FIG. 5 are an example of a "second message". The part data including the character strings 112a, 112b and the part data including the two buttons 112c, from among the screen data supplied to the display unit 14 in S134 of FIG. 5, are examples of "first screen data" and "second screen data", respectively. The AP 50 and the AP 60 are examples of a "first type of access point" and a "second type of access point", respectively. The SSID of the AP 50 and the SSID of the AP 60 are examples of a "first type of network identification information" and a "second type of network identification information", respectively. The cases of YES in S130 of FIG. 5, and NO in S136 of FIG. 5, are examples of a "first case" and a "third case", respectively.

The selection of the SSIDs such as the ones depicted in the selection screens 100, 110 of FIG. 2 and FIG. 4 (i.e. selection of an AP) is not performed by the user in a case where the automatic wireless setting mode is selected and the PBC method of WPS is selected in the menu screen for wireless setting. That is, the AP for which a predefined button (the WPS button) is operated becomes the target AP for performing wireless communication of WPS with the multi-function device 10. Similarly, the SSID selection is not performed by the user in a case where the automatic wireless setting mode is selected and the PIN code method of WPS is selected in the menu screen for wireless setting. That is, the AP for which the PIN code has been inputted becomes the target AP for performing the wireless communication of WPS with the multi-function device 10.

Specifically, the SSID selection (designation) is not performed by the user in ordinary PBC and PIN code methods of WPS. In more general terms, no SSID is selected by the user in an ordinary automatic wireless setting mode. By contrast, the SSID is selected (designated) by the user (S24 in FIG. 2, S124 in FIG. 4) in the case of an ordinary non-automatic wireless setting mode (i.e. in a case where the non-automatic wireless setting mode is selected in the menu screen for wireless setting). In the above embodiments (FIG. 2 to FIG. 5), the SSID is selected by the user and, thereafter (after S24 in FIG. 2 and S124 in FIG. 4), the wireless setting is performed according to the automatic wireless setting mode (see S42 in FIG. 3 and S142, S144 in FIG. 5).

(Variation 1)

The features of the above-described embodiments can be applied not only to the multi-function device 10, but also to other wireless communication devices such as PCs, mobile communication terminals, servers, printers, scanners, telephones, fax machines and the like.

(Variation 2)

In the embodiments above, the display unit 14 of the multi-function device 10 is used as an example of the display unit on which the various screens 100 to 104, 110 and 112 of FIG. 2 to FIG. 5 are displayed. However, there may be used, instead, a display unit of an external device (e.g., a PC) that is wiredly connected (e.g., by way of a USB cable or a LAN cable) to the multi-function device 10.

(Variation 3)

The multi-function device 10 may supply the one or more obtained Probe Response signals to an external device upon completion of the process in S10 and S12 of FIG. 2. In this case, the external device may perform the process from S14 to S24 of FIG. 2, and the process in S30 and from S34 to S40 of FIG. 3. In S24 of FIG. 2 and S34, S38 of FIG. 3, in this case, the external device may display the screens 100, 102, 104 on a display unit in the external device. In the case of NO in S30 of FIG. 3, a predefined screen may be displayed on the display unit of the external device, so that the user may designate thereby a wireless profile. In this case, the external device may supply the wireless profile designated by the user to the multi-function device 10. The wireless setting performing unit 34 of the multi-function device 10 may perform the wireless setting according to the non-WPS by storing the wireless profile obtained from the external device in the wireless profile storage area 28. In the case of NO in S40 of FIG. 3, the external device may instruct the multi-function device 10 to perform the wireless setting with the PBC method of WPS (to perform S42 of FIG. 3). In the present variation, part of the wireless setting performing unit 34 and the obtaining unit 30 is provided in the multi-function device 10, while the determination unit 32, part of the wireless setting performing unit 34 (first and second screen data supplying units 36, 38) as well as the selection screen data supplying unit 40 are provided in the external device. In the present variation, thus, the multi-function device 10 and the external device are an example of a "wireless communication device". The features of the second embodiment can also be modified in the same way as in the present variation.

(Variation 4)

The determination unit 32 determines YES in S16 of FIG. 2 in the case that the target Probe Response signal includes an Information Element (hereafter, "specific IE") indicating that the WPS is being supported, and further, the specific IE includes the first type of information indicating that the PBC method is being supported. Instead, the determination unit 32 may alternatively determine YES in S16 of FIG. 2 in case that the target Probe Response signal includes the specific IE. Specifically, the determination unit 32 need not determine whether the PBC method is being supported. In the present variation, the wireless setting performing unit 34 may perform the wireless setting with the PIN code method of WPS or may perform the wireless setting with the PBC method of WPS, in S42 of FIG. 3. In the present variation, the specific IE is an example of "support information".

(Variation 5)

In the above embodiments, the wireless setting performing unit 34 uses the WPS as the automatic wireless setting mode. Instead, the wireless setting performing unit 34 may also use AOSS (registered trademark) or SES (registered trademark) as the automatic wireless setting mode.

(Variation 6)

In the non-WPS in S32 of FIG. 3 and S132 of FIG. 5, the wireless setting performing unit 34 decides the authentication method and encryption method that the multi-function device 10 is to use in accordance with the instruction by the user. Instead, the below-described procedure (referred to hereafter as "all-challenge procedure") disclosed in US Patent Application Publication Nos. 2010/0082999 and 2010/0082978 may be used. The contents of these documents are hereby incorporated by reference into the present application. Specifically, the wireless setting performing unit 34 selects one combination from among a plurality of combinations of the authentication methods and the encryption methods that the multi-function device 10 is supporting, transmits combination information indicating the selected combination to the selected AP, and obtains, from the selected AP, either OK information indicating that the selected combination is currently set in the selected AP, or NG information indicating that the selected combination is not currently set in the selected AP. In the all-challenge procedure as well, the selected AP is decided through the user's selection of the SSID in the selection screens 100, 110 (FIG. 2, FIG. 4), as in the procedures of the above-described embodiments. If the OK information is obtained, the wireless setting performing unit 34 decides the selected combination as the authentication method and encryption method to be used by the multi-function device 10. If the NG information is obtained, the wireless setting performing unit 34 selects another combination from among the abovementioned plurality of combinations, and repeats the process of re-transmitting the combination information to the selected AP, until the OK information is obtained. Using the all-challenge procedure allows the multi-function device 10 to be wirelessly connected easily to the selected AP in the case where the non-automatic wireless setting mode is employed, since there is no need for the user to check beforehand combinations of the authentication method and the encryption method that are currently set in the selected AR In the all-challenge procedure as well, the user must input, into the multi-function device 10, the wireless password that is currently set in the selected AP. Therefore, the non-automatic wireless setting mode can be regarded as a "mode in which at least one type of information included in a wireless profile that is to be used by the multi-function device 10 (wireless communication device) is decided in accordance with the instruction from the user", both in the all-challenge procedure and in the non-WPS procedures of the above-described embodiments (S32 of FIG. 2 and S132 of FIG. 5). By contrast, the automatic wireless setting mode can be regarded as a "mode in which all information types included in a wireless profile that is to be used by the multi-function device 10 (wireless communication device) are decided without receiving the instruction from the user".

In both the all-challenge procedure and the non-WPS procedures in the above-described embodiments, the wireless profile set in the selected AP is not obtained from the selected AP. Therefore, the non-automatic wireless setting mode can be regarded as a "mode in which the wireless profile to be used by the multi-function device 10 (wireless communication device) is decided without obtaining the wireless profile from the selected AP". By contrast, the automatic wireless setting mode can be regarded as a "mode in which the wireless profile from the selected AP is obtained, and the obtained wireless profile is decided as the wireless profile to be used by the multi-function device 10 (wireless communication device)".

(Variation 7)

In the above-described embodiments, the PBC method and the PIN code method are used as the setting method of the automatic wireless setting mode. However, the setting method of the automatic wireless setting mode may be some other method (e.g., a method using a USB memory, or a method using NFC (Near Field Communication)).

In a method using a USB memory, e.g., the user inserts the USB memory into a USB interface of an external device, such as a PC or the like, if the wireless profile currently set in the selected AP is stored in the external device (so-called Registrar). The wireless profile becomes stored in the USB memory as a result. Next, the user inserts the USB memory into a USB interface (not shown) of the multi-function device 10. The wireless setting performing unit 34 can obtain thereby the wireless profile from the USB memory.

In the method using NFC, e.g., NFC is performed between a selected AP and the multi-function device 10 by bringing the selected AP and the multi-function device 10 close to each other. During the NFC process the wireless setting performing unit 34 can obtain, from the selected AP, the wireless profile currently set in the selected AP.

(Variation 8)

In the process of S124 of FIG. 4, the character strings 110a, 110b are added to both the SSID of the AP 50 and the SSID of the AP 60. Instead, a corresponding character string 110a, 110b may be added to just one of the SSID of the AP 50 and the SSID of the AP 60. Alternatively, the SSID of the AP 50 and the SSID of the AP 60 may be displayed in a dissimilar form (e.g., dissimilar color, dissimilar size), without adding any character strings 110a, 110b. In the present variation as well, the SSID of the AP 50 and the SSID of the AP 60 are displayed so as to be distinguishable by the user.

(Variation 9)

In the foregoing embodiment, respective units 30 to 40 are realized as a result of the control unit 20 performing the processes according to the program 26. Nevertheless, at least one unit of respective units 30 to 40 may alternatively be realized by a hardware resource such as a logic circuit.

The invention claimed is:

1. A wireless communication device comprising:
a controller configured to:
obtain, from each of one or more access points, access point information including network identification information corresponding to the access point, in a case where a non-automatic wireless setting mode is selected by a user in a menu screen for wireless setting, without an automatic wireless setting mode being selected by the user in the menu screen, the automatic wireless setting mode being a mode in which an input of a password is not required, the non-automatic wireless setting mode being a mode in which the input of the password is required;
determine, in a case where specific network identification information corresponding to a specific access point with which the wireless communication device is to be wirelessly connected is selected by the user from among one or more network identification information obtained from the one or more access points, whether specific access point information obtained from the specific access point includes support information indicating that the specific access point is supporting the automatic wireless setting mode; and
perform a wireless setting in accordance with the automatic wireless setting mode in which the input of the password is not required in a first case where a determination is made that the specific access point information includes the support information even if the non-automatic wireless setting mode in which the input of the password is required is selected by the user.

2. The wireless communication device as in claim 1, wherein the controller is further configured to:
supply first screen data to a display unit in the first case, the first screen data including a first message for encouraging the user to select whether the wireless setting in accordance with the automatic wireless setting mode is to be performed, and
in the first case and in a second case where a selection is performed by the user that the wireless setting in accordance with the automatic wireless setting mode is to be performed, the controller is configured to perform the wireless setting in accordance with the automatic wireless setting mode.

3. The wireless communication device as in claim 1, wherein
in the first case, the support information in the specific access point information includes method information indicating a setting method of the automatic wireless setting mode that the specific access point is supporting, and
in the first case, the controller is configured to perform the wireless setting with the setting method indicated by the method information included in the support information in the specific access point information.

4. The wireless communication device as in claim 3, wherein the setting method includes a PBC (Push Button Configuration) method.

5. The wireless communication device as in claim 1, wherein
in the first case, the support information in the specific access point information includes two or more method information indicating two or more setting methods of the automatic wireless setting mode that the specific access point is supporting,
the controller is further configured to supply second screen data to a display unit in the first case, the second screen data including a second message for encouraging the user to select one setting method from among the two or more setting methods, and
in the first case and in a third case where the one setting method is selected by the user from among the two or more setting methods, the controller is configured to perform the wireless setting with the selected one setting method.

6. The wireless communication device as in claim 5, wherein the two or more setting methods include a PBC (Push Button Configuration) method and a PIN (Personal Identification Number) code method.

7. The wireless communication device as in claim 1, wherein the controller is further configured to:
   create, utilizing one or more access point information obtained from the one or more access points, selection screen data in order to supply the selection screen data to a display unit, the selection screen data representing a selection screen for encouraging the user to select one network identification information from among the one or more network identification information,
   the controller is configured to perform the selection screen data such that a first type of network identification information and a second type of network identification information included in the selection screen are displayed in a manner that the first type of network identification information can be distinguished from the second type of network identification information,
   the first type of network identification information is network identification information obtained from a first type of access point that is supporting the automatic wireless setting mode, and
   the second type of network identification information is network identification information obtained from a second type of access point that is not supporting the automatic wireless setting mode.

8. A non-transitory computer-readable recording device storing a computer program for a wireless communication device, the computer program including instructions that when executed cause a computer of the wireless communication device to perform:
   obtaining, from each of one or more access points, access point information including network identification information corresponding to the access point, in a case where a non-automatic wireless setting mode is selected by a user in a menu screen for wireless setting, without an automatic wireless setting mode being selected by the user in the menu screen, the automatic wireless setting mode being a mode in which an input of a password is not required, the non-automatic wireless setting mode being a mode in which the input of the password is required;
   determining, in a case where specific network identification information corresponding to a specific access point with which the wireless communication device is to be wirelessly connected is selected by the user from among one or more network identification information obtained from the one or more access points, whether specific access point information obtained from the specific access point includes support information indicating that the specific access point is supporting the automatic wireless setting mode; and
   performing a wireless setting in accordance with the automatic wireless setting mode in which the input of the password is not required in a first case where a determination is made that the specific access point information includes the support information even if the non-automatic wireless setting mode in which the input of the password is required is selected by the user.

* * * * *